United States Patent [19]

Dudko et al.

[11] 4,292,486

[45] Sep. 29, 1981

[54] APPARATUS FOR DELIVERY OF MELTING RINGS AND VALVES TO AN INDUCTOR HEATER

[76] Inventors: Daniil A. Dudko, ulitsa Anri Barbjusa, 22/26, kv. 113; Anatoly A. Mozzhukhin, ulitsa Grodnenskaya, 3/5, kv. 37, both of Kiev; Vladimir V. Breze, ulitsa Revoljutsionnaya, 12, kv. 40, Tolyatti; Anatoly E. Kozlov, ulitsa Revoljutsionnaya, 73, kv. 85, Tolyatti; Veniamin G. Grigoriev, ulitsa Jubileinaya, 110, kv. 87, Tolyatti; Vladimir P. Sotchenko, ulitsa P. Tychiny, 13, kv. 210, Kiev; Boleslav I. Maximovich, ulitsa Anri Barbjusa, 22/26, kv. 107, Kiev; Bogdan P. Budzan, Dneprovskaya naberezhnaya, 11, kv. 122, Kiev; Vitaly V. Zavodian, bulvar Lepse, 55, kv. 20, Kiev, all of U.S.S.R.

[21] Appl. No.: 104,712

[22] Filed: Dec. 18, 1979

[51] Int. Cl.³ ........................ H05B 5/00; B23K 13/00

[52] U.S. Cl. ..................................... 219/9.5; 219/7.5; 219/10.69; 219/10.75; 228/49 R

[58] Field of Search ............... 219/7.5, 8.5, 9.5, 10.41, 219/10.53, 10.57, 10.69, 10.75; 228/48, 49, 212; 118/1, 503; 269/8; 198/38

[56] References Cited

U.S. PATENT DOCUMENTS

| | | | |
|---|---|---|---|
| 3,911,859 | 10/1975 | Dudko et al. | 118/1 |
| 4,116,375 | 9/1978 | Mozzhukhin et al. | 228/48 |
| 4,144,432 | 3/1979 | Dudko et al. | 219/9.5 |
| 4,199,672 | 4/1980 | Sword et al. | 219/9.5 |

FOREIGN PATENT DOCUMENTS 7802954 5/1979 Sweden .

*Primary Examiner*—Volodymyr Y. Mayewsky
*Attorney, Agent, or Firm*—Lackenbach, Lilling & Siegel

[57] ABSTRACT

An apparatus for delivery of melting rings and valves to an inductor heater, for hard facing of valves for internal combustion engines by melting rings of heat-resistant alloy upon the working surfaces of valves, comprises gravity feed trays, one for feeding the work valves in a vertical position and the other for feeding work rings laid on their side to a tubular body. Between the exit of the tray for feeding the rings and the tubular body there is installed a horizontal tray which is located under the gravity feed tray for feeding the valves and in the same vertical plane with said tray. The distance between the sliding surfaces of the tray along which the valve head moves and the sliding surfaces of the horizontal tray along which the ring lying on its side moves is less than the length of the valve stem, so that the valve stem enters the hole of the ring and delivers it to the tubular body. Near the upper end of the tubular body there is installed a stop interacting with the valve stem for positioning the valve falling into the tubular body with its stem being upwardly directed.

4 Claims, 3 Drawing Figures

APPARATUS FOR DELIVERY OF MELTING RINGS AND VALVES TO AN INDUCTOR HEATER

BACKGROUND OF THE INVENTION

1. Field of the Invention

The present invention relates to welding apparatuses using induction heating wherein work pieces to be welded are previously positioned for the purpose. More particularly, the invention relates to apparatuses for delivery of melting rings and valves to an inductor heater for hard-facing of valves for internal combustion engines by melting rings of heat-resistant alloys upon the working surface of the valves.

Most efficiently the invention can be employed at enterprises engaged in serial production of valves for internal combustion engines.

2. Description of the Prior Art

It is a known fact that to effect hard facing of a valve, an alloy ring is fitted onto its head, the valve is put in a vertical position and the above head with the ring fitted thereupon is placed into a high-temperature heater, for instance a high-frequency inductor.

At present, valves are hard-faced with the aid of devices wherein the fitting of a ring onto the valve head, the positioning of the valve in a vertical alignment and the delivering of the valve into the inductor are carried out by mechanical means, for instance a manipulator.

Despite the automation of the hard-facing process, there still remain possibilities to increase the efficiency of the above devices by shortening the time for assembling the work valve and ring, as well as by carrying out the above assembling at a time when the previous valve is being hard faced.

Also known in the art are apparatuses for hard-facing of valves for internal combustion engines, wherein work valves and the rings to be melted are fed to gravity. Such apparatuses are simple in construction and more efficient as compared with similar apparatuses wherein the assembling is performed by a number of mechanisms.

For instance, known in the art is an apparatus for hard-facing of valves for internal combustion engines comprising a means for assembling the work valve and the ring to be melted (cf. Swedish Pat. No. 7802954-3), including, a vertically positioned tubular body adjoined by gravity feed trays, one for feeding the work valves and the other for feeding the rings; a stop located under the tray for feeding the valves and intended for positioning the valve with its stem being upwardly directed; a receiver for receiving the rings and delivering them onto the valve stem; a pusher located under the tubular body and adapted to deliver the valve with the ring fitted upon its head into the inductor, and a mechanism for holding the valve therein.

To effect delivery of the valves inside the tubular body, the tubular body has a hole adjoined by the tray for feeding the rings to be melted, the receiver for receiving the rings is a kind of curtain inserted into the slot made in the tubular body below the hole for feeding the rings therein. The curtain is connected with a drive providing for its back-and-forward movement.

The pusher for feeding the rings is mounted on a slide and has a tubular body accomodate the valve with the ring fitted thereupon, the pusher slide being connected with the back-and-forward movement drive to provide that the pusher be placed alternately under the tubular body or the inductor.

The tray for feeding the rings has a complicated form which provides for vertically positioning the rings at the entry side of the tray and for its horizontally positioning at the exit side thereof. A separator for by-piece feeding the rings from a storage is mounted at the entry side of the tray for feeding the rings.

To feed the rings with a predetermined side turned in the direction of movement, i.e., to prevent the ring from turning over, there is provided another curtain inserted into the slot made in the tubular body above the aforementioned hole.

Despite the fact that the above apparatus has some advantages typical of the apparatuses using a gravity feed of workpieces to be welded, its application is limited which is due to the fact that the arrangement of the pusher on the slide connected with a drive and the necessity of mechanical processing of the tubular body to obtain various entries and exits for the valves and rings complicate the apparatus design.

In addition, the time spent for feeding successively the valves and rings to the tubular body, for fitting the ring in the receiver, as well as for moving the pusher to under the heater and then back to under the tubular body restrict the efficiency of the above apparatus.

OBJECTS OF THE INVENTION

An object of the invention is to remedy these drawbacks.

The main object of the invention consists in providing an apparatus for delivery of melting rings and valves to an inductor heater, for hard facing of valves for internal combustion engines, wherein the valves and rings are fed by gravity and which being reliable in operation and simple in construction would provide a higher efficiency by fitting the ring upon the stem of the valve while the valve is being moved towards the tubular body, and fitting the ring on the valve head inside the tubular body.

SUMMARY OF THE INVENTION

These and other objects of the invention are attained by the disclosed invention.

The above object is accomplished by an apparatus for delivery of melting rings and valves to an inductor heater, for hard facing of valves for internal combustion engines by melting rings upon the working surface of the valves, comprising an inductor under which there is a vertically installed tubular body wherein the ring is fitted on the valve head; gravity, feed trays, one for delivering the work valve and other for feeding the ring to the tubular body; a receiver located at the exit side of the tray for receiving the rings and feeding them onto the valve stem; a stop mounted near the upper end of the tubular body for positioning the valve with its stem being upwardly directed; a pusher located under the tubular body for delivering the valve with the ring fitted upon the valve head into the inductor; and a mechanism for holding the valve within the inductor. According to the invention, the tubular body and the pusher are installed directly under the inductor. The receiver for receiving the rings is made substantially in the form of a horizontal tray which adjoins the tubular body, has a central longitudinal slot and is mounted under the gravity free tray for delivering the valves in the same vertical plane therewith, the distance between sliding surfaces of the tray for feeding the valve and of said horizontal tray being less than the length of the valve stem so that the valve stem enters the hole of the ring with its end and delivers the ring to the tubular body.

Such an apparatus is simple in construction, reliable in operation and, at the same time, more efficient. This is achieved due to the fact that the receiver for receiving the ring is made substantially in the form of a horizontal tray from which the rings are delivered by the valves to the tubular body wherein they are fitted on the valve heads. This, in turn, makes it possible to use to a full extent the gravity feed of the workpieces and makes unnecessary any mechanism for fitting the ring upon the valve stem.

It is expedient that on the sliding surfaces of the horizontal tray, at the side adjoining the gravity feed tray for feeding the rings, there be provided an inclined portion with an angle of slope being from 0° to 15° and opposite to the direction of feeding the rings towards the tubular body.

As a result, the entering of the end of the valve stem into the hole of the ring to be melted becomes more accurate when the valve moves along the gravity feed tray towards the tubular body.

It is preferable that above the sliding surfaces of the gravity feed tray for feeding the valves there is mounted a plate interacting with the end faces of the valve heads, thereby preventing the work valves from swinging.

BRIEF DESCRIPTION OF DRAWINGS

The invention will now be described in detail with reference to the accompanying drawings, wherein the same parts are given the same reference numerals, and in which.

DETAILED DESCRIPTION OF THE INVENTION

Figures 1, 2, 3:
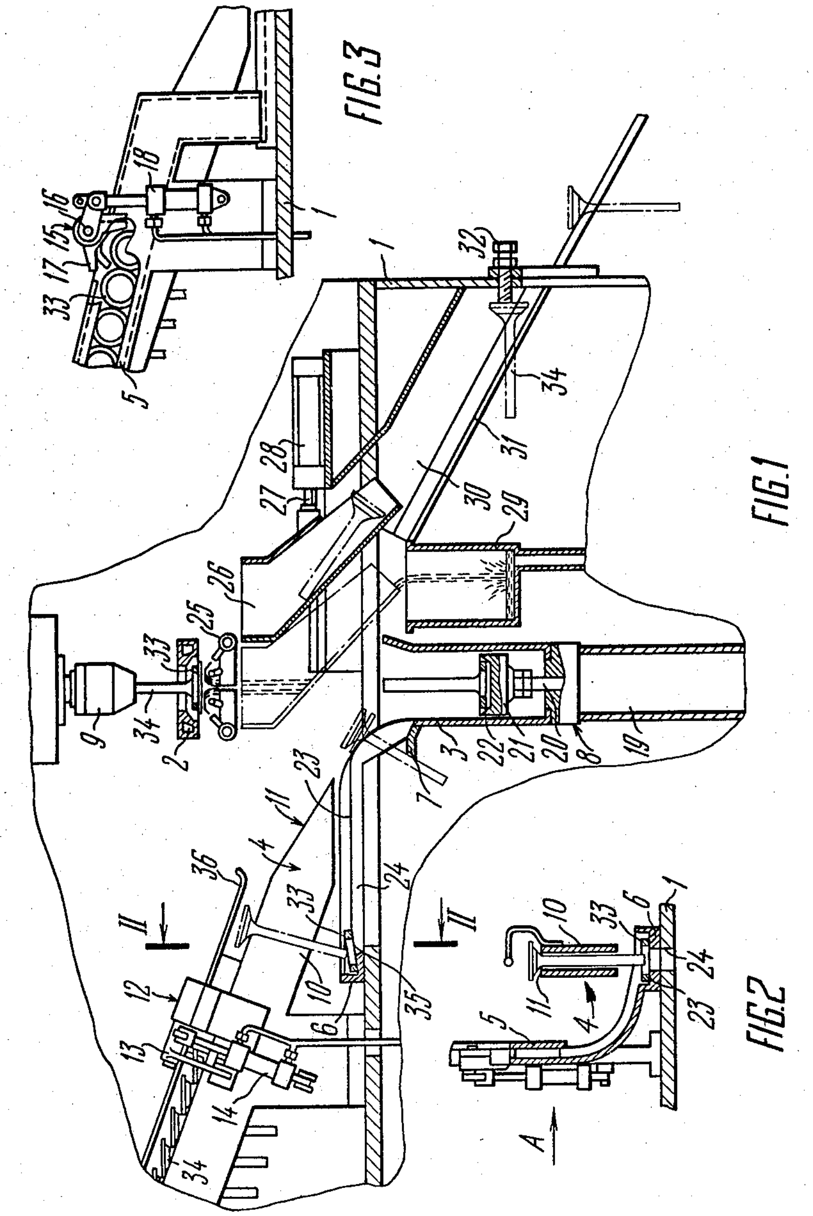
FIG. 1 is a front elevational partly in section of the apparatus for delivery of melting rings and valves to an inductor heater, according to the invention.
FIG. 2 is a partial cross sectional of FIG. 1 along the line II—II, showing the gravity feed tray for feeding the valves and the gravity feed tray for feeding the rings, the latter tray being adjoined by the horizontal tray.
FIG. 3 is a partial view of FIG. 2 in the direction of arrow A, showing the partially opened tray for feeding the rings, and the separator for feeding the rings by the piece.

An apparatus for delivery of melting rings 33 and valves 34 to an inductor heater, as shown in FIG. 1, comprises a bed 1. Mounted on the bed 1 are: an inductor heater 2 of a conventional construction under which there is a vertically installed tubular body 3 wherein the ring is fitted on the valve head; gravity feed trays 4 and 5/FIG. 2/, for respectively delivering to the tubular body 3 the work valves and the rings to be melted; a receiver 6 (FIGS. 1 and 2), located at the exit side of the ring feeding tray 5, for receiving and feeding the rings onto the valve stems; a stop 7 located near the upper end of the tubular body 3 for positioning the valve with its stem upwardly directed; a pusher 8 located under the tubular body 3 for delivering the valve with the ring fitted upon the valve head into the inductor 2; and a holding mechanism 9 for holding the valve within the inductor 2.

The gravity feed tray 4 for feeding the valves is formed by two parallel plates 10, the upper edges 11 of which serve as sliding surfaces and guides for the valve heads. The sliding surfaces 11 are at an angle to the horizontal plane so as to enable movement of the rings under the action of their own weight. On the valve feeding tray 4 there is mounted a separation device 12 for separating one valve from other valves on the tray 4. The device 12 for separating a valve is a separator known in the art, comprising a rocker 13 mounted on an axle and linked with a drive 14 providing for oscillation movement thereof.

The gravity feed tray 5 for feeding the rings to be melted has, in cross-section, the form of a box corresponding to the form of the ring delivered. In addition, the tray 5 has a curved form along its length to enable the movement of the rings in a vertical position at the entry side of the tray 5 and in a horizontal position at the exit. Adjacent the exit of the tray 5 is the receiver 6 for receiving the rings and feeding them onto the valve stem. On the tray 5 is mounted a device 15 (FIG. 3) for by-piece feeding of the rings to be melted, i.e. for separating one ring from the rest of the rings on the ring feeding tray 5. The device 15 is a separator known in the art, comprising a rocker 17 mounted on an axle 16 and linked with a drive 18 providing for oscillation movement thereof.

The pusher 8 (FIG. 1) for delivering the valve with the ring into the inductor 2 is known in the art and includes an air-operated cylinder 19 on the rod 20 of which there is mounted a plate 21 with a circular conical fillet 22. The plate 21 is inserted into the tubular body 3 and adapted to receive the work valve delivered in a headdown position.

The mechanism 9 for holding the valve inside the inductor 2 is known in the art and includes a jaw chuck 9 having a drive providing for its rotation (not shown), and mounted above the inductor 2.

According to the invention, the receiver 6 for receiving the rings and feeding them onto the stems of the work valves is made substantially in the form of a horizontal tray 6 which has sliding surfaces 23 /FIGS. 1 and 2/ for the rings to move there. The horizontal tray 6 is mounted between the exit of the gravity feed tray 5 for feeding the rings and the tubular body 3, and located under the gravity feed tray 4 for feeding the work valves in the same vertical plane as its own. The horizontal tray 6 is so installed that the distance between its sliding surfaces 23 and the sliding surfaces 11 of the tray 4 for feeding the valves is less than the length of the stem of the work valve so that the work valve can enter the hole of the ring with its end and delivers the ring to the tubular body 3. The horizontal tray 6 has a central longitudinal slot 24 which divides the surface of the tray into two sliding surfaces 23 for the rings to move there.

As shown in FIG. 2, the horizontal tray 6 adjoins the exit of the gravity feed tray 5 for feeding the rings and is essentially perpendicular to the direction of the ring movement from the feed tray 5.

The pusher 8 /FIG. 1/ for delivering the valve with the ring fitted thereupon into the inductor 2 is stationary mounted immediately under the inductor 2.

To cool the work valve, the present apparatus is provided with a ring-shaped sprayer 25. The sprayer 25 side facing the inductor 2 has a number of holes for water jets sprayed in the direction of the inductor 2.

To discharge the hard faced valves, said apparatus is provided with a slide 26 which is located under the inductor 2. The slide 26 is a bucket open from beneath and mounted on a rod 27 of an air-operated cylinder 28 installed on the bed 1 and made of a known construction.

The lower side of the slide 26 is adapted for discharging the valve and for pouring off the cooling water into a waste-water tank 29 located on the bed 1.

Below the slide 26 there is mounted a discharging tray 30 having the form of a trough with a central longitudinal slot 31. The upper end of the discharging tray 30 adjoins the waste-water tank 29, while its lower end is outside the apparatus. To position the valve with its head upwardly directed and discharge it in the same position from the apparatus, there is a stop 32 in the form of a screw mounted on the bed 1.

To better illustrate the operation of the apparatus for delivery of melting rings and valves to an inductor heater, its operation is described in automatic operation mode, the means for effecting such automatic operation not described, nor shown in the drawings, to avoid the complication of the description and to make the invention more understandable.

In the description of operation of said apparatus that follows said means is referred to as a control system.

The operation of the above apparatus for delivery of melting rings and valves to an inductor heater is as follows.

On command from the control system /FIGS. 2 and 3/ the rocker 17 begins oscillating, one of its arms releases the ring held, while the other arm closes the tray 5, preventing the rest of the rings from advancing.

Under the action of its weight the released ring 33 rolls along the tray 5 and then, on leaving said tray, is laid on its side and delivered in such position to the horizontal tray 6 /FIGS. 1 and 2/.

On giving the command for one valve 34 to be fed, the rocker 13 begins oscillating, one of its arms releases the valve held, while the other arm closes the space between the plates 10 thereby preventing the rest of the valves from advancing.

Sliding under the action of its weight, along the sliding surfaces 11 of the plates 10 in a vertical position, the valve 34 moves towards the tubular body 3. As the end of the valve 34 stem reaches the horizontal tray 6, the stem enters the hole of the ring 33 to be melted and the valve 34 with the ring continues moving toward the tubular body 3.

As the valve comes nearer to the tubular body 3, the head of the valve 34 leaves the sliding surfaces of the tray 4 for feeding the valves and the ring 33 slides up the stem of the valve 34 until it is adjacent the head of the valve 34, and now moves with the valve along the horizontal tray 6.

On reaching the stop 7 of the tubular body 3, the valve 34 with the ring 33 hits the stop 7 with its stem, assumes the head-down position and, on falling inside the tubular body 3, rests with its head upon the surface of the plate 21 of the pusher 8. While the valve 34 is being placed upon the plate 21, the ring 34 to be melted is guided by the conical fillet 22 of the plate 21 to assume the melting position on the valve 34 head.

On the command for feeding valve 34 with the ring fitted thereupon into the inductor 2, the air-operated cylinder 19 operates in a conventional manner, its rod 20 moves upwards and delivers the valve 34 positioned vertically on the plate 21, with the ring 33 fitted thereupon, to the inductor 2 and the clamping chuck 9. As the end of the valve 34 stem reaches the hole /not shown/ of the clamping chuck 9, and the valve 34 head reaches the hole of the inductor 2, the end of the valve 34 stem presses a conventional end switch /not shown/ located within the clamping chuck 9.

Then, according to the control system, commands are given: for moving downwards the rod 20 with the plate 21, for the airoperated cylinder 28 to be operated to bring the slide 26 under the inductor 2 and, finally, for the water to be fed to the sprayer 25. At the same time, the following pair of work parts, i.e. the valve and the ring, are suspended in the inductor 2 and held securely by the clamping chuck 9.

The cooling water from the sprayer 25 is directed at the valve 34 head for cooling the valve. The waste water flows down the slide 26 into the waste-water tank 29.

On completing the hard facing of the valve working surface, commands are given to stop feeding the water into the sprayer 25, unclasp the chuck 9, and start the air-operated cylinder 28 to remove the slide 26 from under the inductor 2. The released valve falls from the unclasped chuck 9 and, on passing through the inductor 2, arrives at the slide 26 which is being removed from under the inductor 2 and, thereby, is delivered to a discharge tray 30.

Having fallen on the discharge tray 30, the hard faced valve is moved therein and, on hitting a stop 32, is positioned with its head being upwardly directed, and leaves the apparatus in the same position.

According to another embodiment of the invention /FIG. 1/, the sliding surfaces 23 of the horizontal tray 6, on the side the tray 6 adjoins the exit of the tray 5 for feeding the rings, have an inclined portion 35 with an angle of slope being from 0° to 15° and opposite to the direction of feeding the rings towards the tubular body.

As a result, the entering of the end of the valve 34 stem into the hole of the ring 33 becomes more accurate. The increase of the angle between the sliding surfaces 11 of the tray along which the valve 34 is moved and the surface of the area 35 of the horizontal tray 6 results in enlarging the projection of the ring hole in which the end of the valve stem enters.

According to yet another embodiment of the invention, above the sliding surfaces 11 of the gravity feed tray 4 for feeding the valves there is mounted a plate 36 which is parallel to said surfaces 11 and intended for interacting with the face plane of the valve head and for preventing the work valve from swinging at the moment it engages the ring.

The above specific embodiments of the invention allow various alterations and additions obvious to experts in the art. Therefore, the invention is not limited by the aforedescribed embodiments or individual elements and allows the introduction of changes or additions which do not depart from the spirit and scope thereof, defined by the claims herein appended.

We claim:

1. An apparatus for delivery of melting rings and valves to an inductor heater, for hard facing of said valves by melting said melting rings upon a working surface of said valves, comprising:

an inductor heater;

a tubular body installed vertically under said inductor heater;

a first gravity feed tray for feeding said valves;

a second gravity feed tray for feeding said melting rings;

a horizontal feed tray positioned between an exit of said second gravity feed tray and said tubular body and under said first gravity feed tray, said melting rings being delivered onto said horizontal feed tray from said second gravity feed tray, the distance between sliding surfaces of said first gravity feed tray and sliding surfaces of said horizontal feed tray being less than the length of stems of said valves, such that said stems of said valves engage respective rings and slide along said horizontal feed tray toward said tubular body;

a stop positioned near an upper end of said tubular body and near an end of said horizontal feed tray and orienting said valve in said tubular body with said stem of said valve upwardly directed;

a pusher positioned under said tubular body and delivering said valve and said melting ring to said inductor heater; and a clamping mechanism for holding said valve and melting ring within said inductor heater.

2. An apparatus according to claim 1, wherein the sliding surfaces of said horizontal feed tray on the side of its adjoining said second gravity feed tray have an inclined portion with an angle of slope being from 0° to 15° and opposite to the direction of feeding the rings towards said tubular body.

3. An apparatus according to claim 1, wherein above the sliding surfaces of said first gravity feed tray there is installed a plate which is parallel to said sliding surfaces and interacts with the end face of the valves for feeding the valves in a predetermined vertical position.

4. An apparatus according to claim 1, wherein said first gravity feed tray includes two parallel plates having upper edges that serve as said sliding surfaces, and a separator for feeding one valve at a time;

said second gravity feed tray includes a separator for feeding one melting ring at a time and has a curved form that enables vertical movements of said melting rings at an entry portion of said second gravity feed tray and horizontal movement of said melting rings at said exit of said second gravity feed tray;

said horizontal feed tray includes a central longitudinal slot through which said stems of said valves move as heads of said valves slide along said sliding surfaces of said horizontal feed tray; and said pusher includes a plate with a fillet to orient said melting ring about said head of a respective valve.

* * * * *